United States Patent
Furukawa (10) Patent No.: US 12,163,452 B2
(45) Date of Patent: Dec. 10, 2024

(54) ELECTRONIC DEVICE, VEHICLE, AND CONTROL METHOD

(71) Applicant: ISUZU MOTORS LIMITED, Yokohama (JP)

(72) Inventor: Takayuki Furukawa, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/390,418

(22) Filed: Dec. 20, 2023

(65) Prior Publication Data

US 2024/0254907 A1  Aug. 1, 2024

(30) Foreign Application Priority Data

Jan. 30, 2023  (JP) .................................. 2023-012134

(51) Int. Cl.
*F01N 3/20* (2006.01)
*B60L 50/60* (2019.01)

(52) U.S. Cl.
CPC ............ *F01N 3/2013* (2013.01); *B60L 50/60* (2019.02)

(58) Field of Classification Search
CPC ...... F01N 3/2013; F01N 9/00; F01N 2590/11; F01N 2240/16; F01N 2900/1602; F01N 2900/10; F01N 2900/08; F01N 3/2006; F01N 5/02; F01N 2900/1404; F01N 2900/1631; F01N 2550/22; F01N 2240/36; F01N 3/027; F01N 2900/1811; F01N 2410/00; F01N 2240/20; F01N 3/10; F01N 2900/0602; F02D 2200/503
See application file for complete search history.

(56) References Cited

U.S. PATENT DOCUMENTS

| 11,603,789 | B1 * | 3/2023 | Ferrel ................. B60H 1/2218 |
| 2011/0047981 | A1 | 3/2011 | Roos et al. |
| 2021/0222638 | A1 * | 7/2021 | Hirooka ................ F01N 3/2026 |
| 2021/0372310 | A1 | 12/2021 | Bare et al. |
| 2022/0282654 | A1 | 9/2022 | Bare et al. |
| 2022/0397048 | A1 * | 12/2022 | Martz ....................... F01N 5/04 |
| 2023/0219557 | A1 * | 7/2023 | Yamanouchi ......... B60W 10/26 701/22 |
| 2024/0167408 | A1 | 5/2024 | Bare et al. |

FOREIGN PATENT DOCUMENTS

| DE | 102010035480 A1 | 3/2011 |
| DE | 102021113464 A1 | 12/2021 |
| JP | 2004-245135 A | 9/2004 |
| JP | 2021-110268 A | 8/2021 |
| WO | 2020/0249991 A1 | 12/2020 |

* cited by examiner

*Primary Examiner* — Anthony Ayala Delgado
(74) *Attorney, Agent, or Firm* — PROCOPIO, CORY, HARGREAVES & SAVITCH LLP (57) ABSTRACT

An electronic device includes: an acquiring part that acquires a state of charge of a battery that is electrically connected to a motor performing recovery power generation and is charged by the motor, and a control part that controls the driving of a heater that raises the temperature of a catalyst of an after-treatment device that purifies exhaust gas discharged from an engine. The control part drives the heater so that the heater is heated by the electric power of the battery if the state of charge of the battery acquired by the acquiring part is equal to or greater than a first threshold.

6 Claims, 5 Drawing Sheets

ELECTRONIC DEVICE, VEHICLE, AND CONTROL METHOD

CROSS-REFERENCE TO RELATED APPLICATIONS

The present application claims priority to Japanese Patent Application number 2023-12134, filed on Jan. 30, 2023 contents of which are incorporated herein by reference in their entirety.

BACKGROUND OF THE INVENTION

The present disclosure relates to an electronic device, a vehicle, and a control method. Japanese Unexamined Patent Application Publication No. 2004-245135 discloses the use of energy recovered during deceleration, a portion of which cannot be received by a battery, as regenerated or recovered energy for an exhaust gas purification device of an internal combustion engine.

In a vehicle such as a hybrid vehicle, braking energy cannot be recovered and supplied to the battery when the battery is fully charged. In the configuration of Patent Document 1, a braking recovery function cannot be restored when the battery remains fully charged.

BRIEF SUMMARY OF THE INVENTION

Accordingly, the present disclosure has been made in view of these points, and its object is to provide a technique that allows the early restoration of a braking recovery function and the effective use of recovered energy.

An electronic device according to an aspect of the present disclosure includes: an acquiring part that acquires a state of charge of a battery that is electrically connected to a generator performing recovery power generation and is charged by the generator; and a control part that controls driving of a heater that raises a temperature of a catalyst of an after-treatment device that purifies exhaust gas discharged from an engine, wherein the control part controls the heater so that the heater is heated by electric power of the battery if a state of charge of the battery acquired by the acquiring part is equal to or greater than a first threshold.

A vehicle according to an aspect of the present disclosure includes the electronic device.

A control method according to an aspect of the present disclosure is a control method, executed by a computer, for controlling driving of a heater that raises a temperature of a catalyst of an after-treatment device that purifies exhaust gas discharged from an engine: the control method includes: acquiring a state of charge of a battery that is electrically connected to a generator performing recovery power generation and is charged by the generator; and driving the heater so that the heater is heated by electric power of the battery if an acquired state of charge of the battery is equal to or greater than a first threshold.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Figure 1:
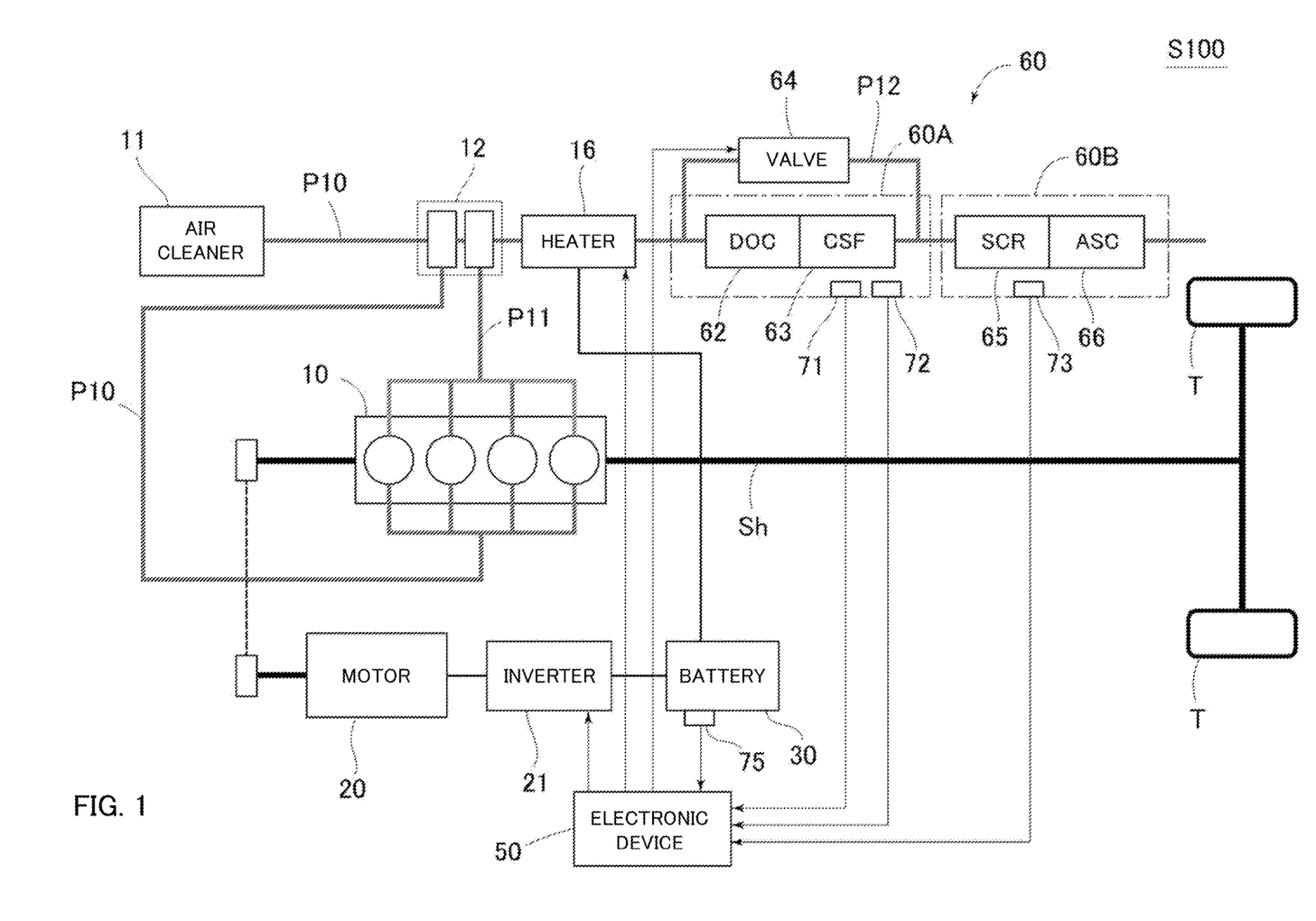
FIG. 1 is a diagram schematically showing a configuration of a vehicle.

FIG. 1 is a diagram schematically showing a configuration of a vehicle S100. The vehicle S100 is a hybrid vehicle having an engine and an electric motor serving as a power source for traveling, for example. The vehicle S100 is a large vehicle, such as a truck.

As shown in FIG. 1, the vehicle S100 mainly includes an engine 10, a motor 20, a battery 30, an electronic device 50, and an after-treatment device 60. One of the features of the vehicle S100 is that the electric power of the battery 30 is used for raising the temperature of the after-treatment device 60 in order to restore a braking recovery function when a state of charge of the battery 30 is high. In this specification, driving a heater in this manner is also referred to as an SOC control.

The engine 10 burns and expands a mixture of fuel and intake air in cylinders to generate thermal energy. The engine 10 rotatably drives a crankshaft, which is a rotary shaft, with thermal energy. The engine 10 is a diesel engine, for example, but the embodiment is not limited thereto, and may be a gasoline engine, for example.

The output of the engine 10 is transmitted to a propeller shaft Sh via an automatic transmission mechanism (not shown). The propeller shaft Sh rotates to rotate a pair of drive wheels T, allowing the vehicle to move forward or backward.

The motor 20 operates as the electric motor or a generator, depending on the traveling state of the vehicle S100. The motor 20 is one type of power source for rotating the propeller shaft Sh. For example, if the vehicle S100 decelerates, the motor 20 operates as the generator using the rotational force of the propeller shaft Sh as motive power.

The battery 30 is a lithium-ion battery, for example. The battery 30 supplies electric power to the motor 20 when the motor 20 operates as the electric motor. Further, when the motor 20 operates as the generator, the battery 30 is charged with electric power (specifically, recovered electric power generated by converting kinetic energy into electric energy) generated by the motor 20. That is, the battery 30 is electrically connected to the motor 20 that performs recovery power generation, and is charged with electric power from the motor 20.

The battery 30 is provided with a remaining amount sensor 75. The remaining amount sensor 75 measures the state of charge (SOC) of the battery 30 to output the measured state of charge to the electronic device 50.

An inverter 21 is provided between the motor 20 and the battery 30. The inverter 21 converts DC power into AC power and converts AC power into DC power. When the motor 20 operates as the electric motor, the inverter 21 converts the DC power of the battery 30 into AC power to supply electric power to the motor 20. When the motor 20 operates as the generator, the inverter 21 converts AC power generated by the motor 20 into DC power to supply electric power to the battery 30.

(Intake Passage and Exhaust Passage)

An intake passage and an exhaust passage for the engine 10 in the vehicle S100 will be described before describing the electronic device 50 and the after-treatment device 60. As shown in FIG. 1, the vehicle S100 includes an intake passage P10 for supplying air to the engine 10 and an exhaust passage P11 through which exhaust gas from the engine 10 flows. The intake passage P10 and the exhaust passage P11 may have a conventionally-known configuration used in this type of vehicle, and therefore detailed description thereof will be omitted in this specification.

In FIG. 1, the intake passage P10 extends from an air cleaner 11 to the engine 10. The air cleaner 11 is a filter for removing foreign substances in air taken into the engine 10. The air taken from the air cleaner 11 is supplied to a turbocharger 12 through the intake passage P10. Although not shown, the intake passage P10 is provided with an intercooler, an intake throttle valve, or the like.

The turbocharger 12 compresses the air taken from the intake passage P10 by rotating a turbine using the exhaust of the engine 10. Supplying the air compressed by the turbocharger 12 to the engine 10 increases torque generated by the engine 10 in one combustion process.

The exhaust passage P11 is connected to the exhaust side of the engine 10. Although not shown, the vehicle S100 is provided with an EGR (exhaust gas recirculation) system that routes a portion of exhaust gas that has flowed into the exhaust passage P11 back to an upstream side of the engine 10.

The exhaust passage P11 is provided with a heater 16 and the after-treatment device 60 in addition to the above-described turbocharger 12. A first purification device 60A and a second purification device 60B are provided as the after-treatment device 60 in this example. These purification devices themselves have conventionally-known configurations and functions, for example.

The heater 16 is an electric heater driven by the electric power of the battery 30. Driving of the heater 16 is controlled by the electronic device 50. Driving the heater 16 heats exhaust gas in the exhaust passage P11. The heated exhaust gas flowing downstream raises the temperatures in the first purification device 60A and the second purification device 60B.

The first purification device 60A is provided upstream of the second purification device 60B along a flow path through which the exhaust gas flows, and collects particulate matter in the exhaust gas. The first purification device 60A is a diesel particulate diffuser (DPD), for example. The first purification device 60A is provided in the flow path through which the exhaust gas flows, and includes a filter for collecting particulate matter in the exhaust gas.

Specifically, the first purification device 60A mainly includes a DOC (Diesel Oxidation Catalyst) 62 and a CSF (Catalyzed Scoot Filter) 63. Further, a bypass passage P12 is provided such that it bypasses the first purification device 60A.

The DOC 62 contains a noble metal catalyst and oxidizes unburned gas in the exhaust gas from the engine 10. For example, the DOC 62 oxidizes hydrocarbon, carbon monoxide, and nitrogen oxide. The CSF 63 is obtained by adding a catalyst to a soot filter. The CSF 63 is provided downstream of the DOC 62.

A valve 64 is provided in the bypass passage P12 that connects the upstream side of the DOC 62 and the downstream side of the CSF 63. The bypass passage P12 is a passage for supplying exhaust gas to the second purification device 60B by bypassing the first purification device 60A.

The valve 64 is a solenoid valve, for example. The valve 64 opens and closes the flow path of the bypass passage P12. The valve 64 may adjust the flow by changing the cross-sectional area of the flow path of the bypass passage P12. The operation of the valve 64 is controlled by the electronic device 50, for example. It should be noted that the bypass passage P12 and the valve 64 are components of the after-treatment device 60.

The first purification device 60A is provided with a temperature sensor 71 and a deposition amount estimation sensor 72.

The temperature sensor 71 measures the temperature in the first purification device 60A, which is a part of the after-treatment device 60. The temperature sensor 71 outputs the measured temperature. The temperature sensor 71 measures the temperature of an inlet portion of the CSF 63 (the temperature of exhaust gas), for example.

The deposition amount estimation sensor 72 estimates the amount of PM, which is particulate matter accumulated in the CSF 63, for example. The deposition amount estimation sensor 72 outputs the estimated amount of PM. The deposition amount estimation sensor 72 may estimate that PM is accumulated beyond a certain amount. The temperature sensor 71 and the deposition amount estimation sensor 72 are both electrically connected to the electronic device 50. The electronic device 50 acquires output values from these sensors, as will be described later.

The second purification device 60B is provided downstream of the first purification device 60A. The second purification device 60B is a purification device with SCR (Selective Catalytic Reduction) having a selective reduction catalyst serving as a catalyst for purifying exhaust gas. In this example, the second purification device 60B includes an SCR 65 and an ASC (Ammonia Slip Catalyst) 66.

The SCR 65 removes nitrogen oxide from exhaust gas from the engine 10. The SCR 65 is a selective reduction catalyst, and selectively reduces nitrogen oxide in exhaust gas using a reducing agent to remove nitrogen oxide, for example.

The ASC 66 is an ammonia slip catalyst. The ammonia slip catalyst is provided to prevent excess ammonia, which has not been used for reduction, from being discharged into the outside air.

The second purification device 60B is provided with a temperature sensor 73 that measures the temperature of the SCR 65, for example. The temperature sensor 73 outputs the measured temperature to the electronic device 50.

(Electronic Device)

Figure 2:
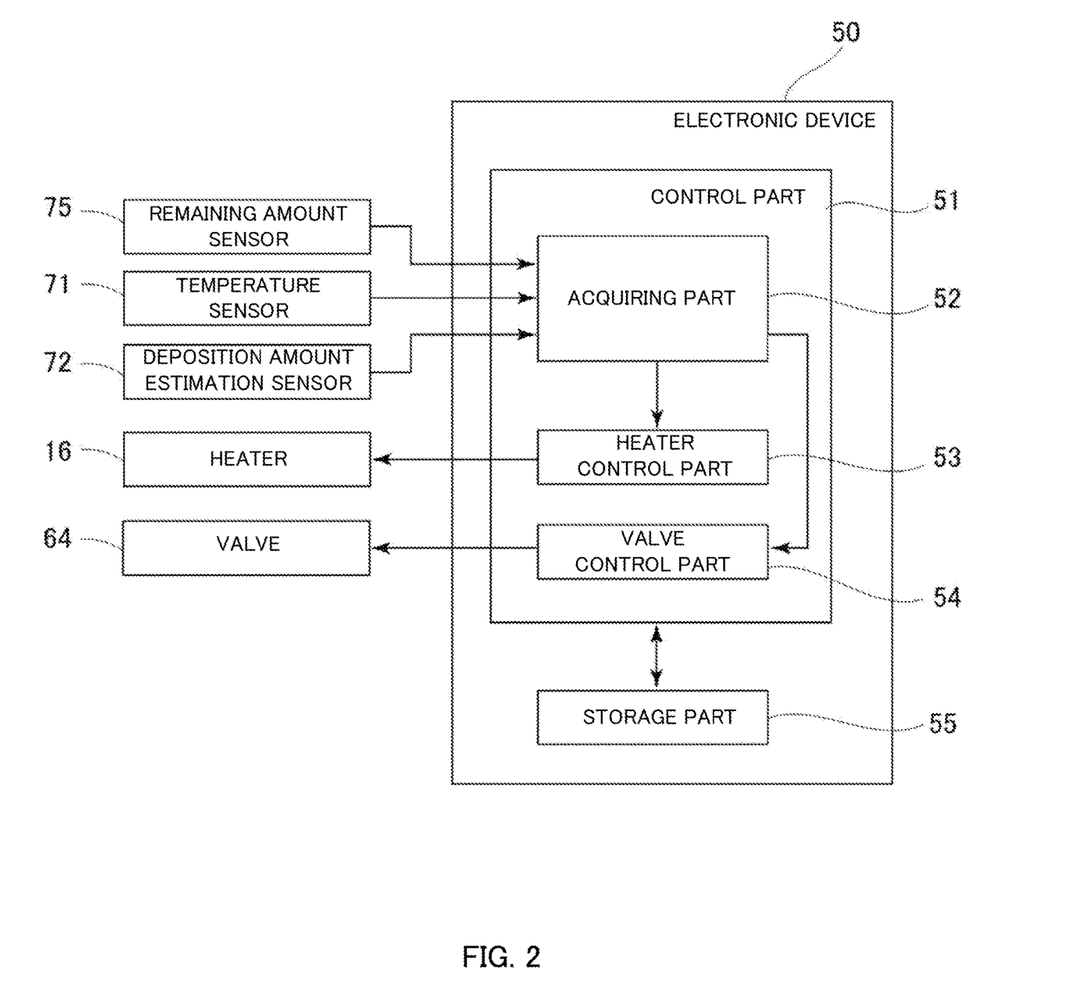
FIG. 2 is a block diagram illustrating a configuration of an electronic device.

FIG. 2 is a block diagram illustrating a configuration of the electronic device 50. The electronic device 50 is a control device that controls the operation of each device of the vehicle S100. The electronic device 50 is an electronic control unit (ECU), for example. As shown in FIG. 2, the electronic device 50 includes a control part 51 and a storage part 55.

The storage part 55 includes a storage device such as a memory, a hard disk, or a solid state drive (SSD). The storage part 55 stores data such as a program and a table for implementing each function of the vehicle S100. The storage part 55 stores a first threshold and a second threshold that is lower than the first threshold, which are related to the state of charge of the battery 30. The storage part 55 stores a first set temperature and a second set temperature that is lower than the first set temperature for the heater 16. The storage part 55 stores a third threshold related to the state of charge of the battery 30 for stopping driving of the heater 16.

The control part 51 includes an acquiring part 52, a heater control part 53, and a valve control part 54. The control part 51 is a computer processor, for example, and functions as the respective parts by executing a program stored in the storage part 55. The control part 51 may be configured by a combination of one or more processors and one or more electronic circuits.

The acquiring part 52 acquires the state of charge of the battery 30. Specifically, the acquiring part 52 acquires the state of charge of the battery 30 from the remaining amount sensor 75 provided in the battery 30, for example.

The acquiring part 52 also acquires the temperature in the after-treatment device 60. The acquiring part 52 may acquire any one of the temperatures of the first purification device 60A and the second purification device 60B. In the present embodiment, however, the acquiring part 52 acquires both of these temperatures, as an example.

The acquiring part 52 also acquires the estimated amount of PM, which is the amount of particulate matter deposited in the CSF 63. The acquiring part 52 acquires the estimated amount of PM from the deposition amount estimation sensor 72, for example. It should be noted that the deposition amount estimation sensor 72 does not necessarily need to output the amount of PM, and may output any information indicating that PM has been deposited.

The acquiring part 52 also acquires a cumulative travel distance, which is a distance that the vehicle S100 traveled since DPD regeneration was performed last time, for example. Since the electronic device 50 can calculate the cumulative travel distance by using a conventionally-known method, for example, detailed description thereof will be omitted.

The heater control part 53 controls the driving of the heater 16. Driving the heater 16 raises the temperature of exhaust gas that has passed through the heater 16, and the exhaust gas flowing through the first purification device 60A and the second purification device 60B raises the temperature of each catalyst thereof.

As described above, the battery 30 is charged with recovered electric power from the motor 20 serving as the generator. When the state of charge of the battery 30 becomes equal to or greater than a certain level, the braking energy of the vehicle S100 cannot be recovered sufficiently. Accordingly, in the present embodiment, the heater control part 53 performs the following control in order to restore the braking recovery function early.

(Restoration Operation of the Braking Recovery Function)

To restore the braking recovery function, control to reduce the state of charge of the battery 30 may be performed. Accordingly, the heater control part 53 drives the heater 16 if the state of charge of the battery 30 acquired by the acquiring part 52 is equal to or greater than the first threshold. The first threshold may be any state of charge, and is "80%", for example. Driving the heater 16 consumes the electric power of the battery 30 and reduces the state of charge of the battery 30.

The heater control part 53 stops the heater 16 if the state of charge of the battery 30 has decreased to the third threshold, for example. The third threshold is any value that is equal to or less than the first threshold. The heater control part 53 may stop driving the heater 16 when a predetermined time period has passed.

(Another Example of Condition for Stopping the Heater)

In addition to the above, the heater control part 53 may stop driving the heater 16 on at least one of the following conditions: (i) a DPD regeneration control has been started; (ii) the temperature of the after-treatment device 60 or exhaust gas has become abnormally high (that is, the temperature has become equal to or higher than a certain set value); or (iii) the key of the vehicle S100 has been turned off.

(Operation According to the Catalyst Temperature)

The heater control part 53 may drive the heater 16 in different modes according to the state of charge of the battery 30 and the temperature of the catalyst of the after-treatment device 60, for example. For example, the heater control part 53 drives the heater 16 at the first set temperature if the state of charge is equal to or greater than the first threshold, and the heater control part 53 drives the heater 16 at the second set temperature if the state of charge is less than the first threshold and equal to or greater than the second threshold. The second threshold is lower than the first threshold, and is "70%", for example. The first threshold is a value indicating that the priority of reducing the state of charge of the battery 30 is high, and the second threshold is a value indicating that the priority of reducing the state of charge is medium, for example.

Figure 3:
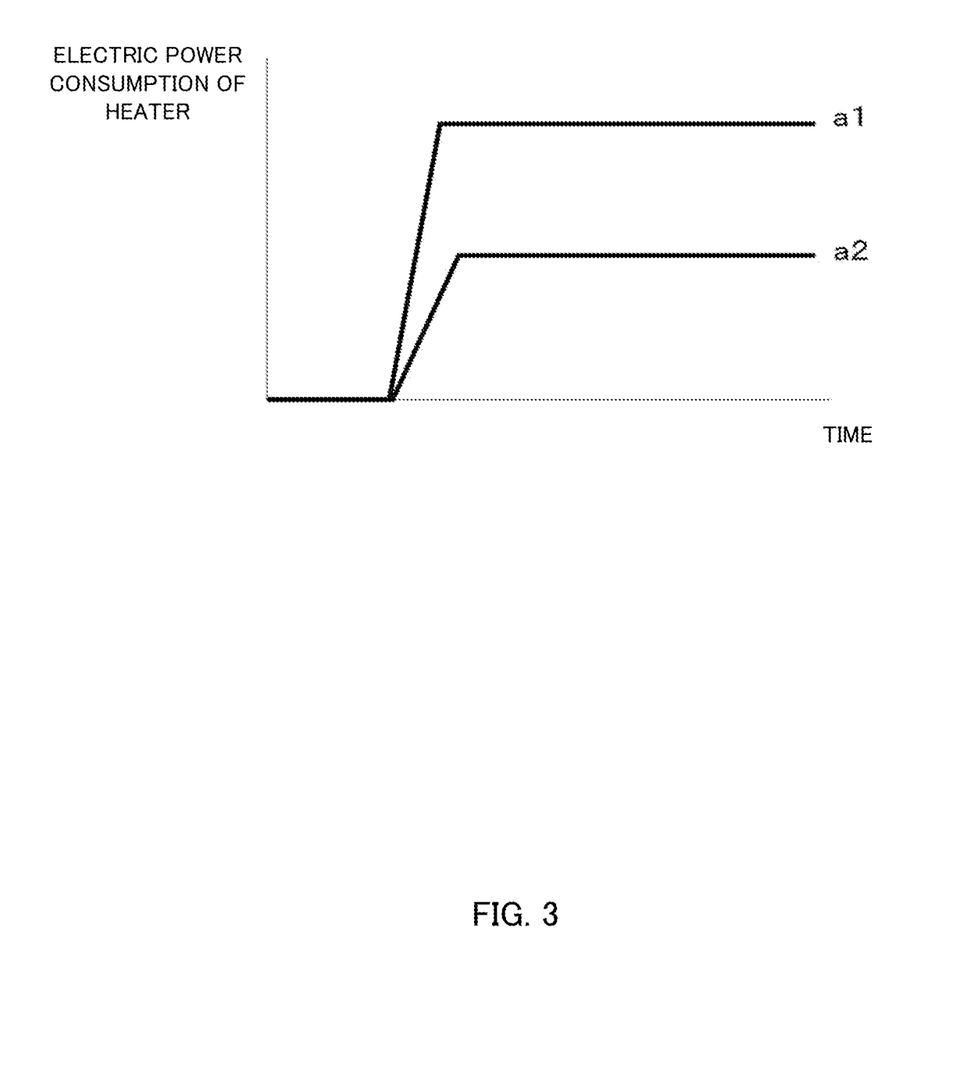
FIG. 3 is a diagram for explaining a first set temperature and a second set temperature.

FIG. 3 is a diagram for explaining the first set temperature and the second set temperature. The first set temperature is a temperature at which the electric power consumption of the heater is high, and is set to a relatively high temperature, as indicated by a reference numeral a1. The second set temperature is a temperature at which the electric power consumption of the heater is low, and is set to be lower than the first set temperature, as indicated by a reference numeral a2. The first set temperature is a temperature that is set as a DPD regeneration assist mode, for example. The second set temperature is a temperature that is set as a DPD preheating mode at a lower temperature than the DPD regeneration assist mode, for example.

If the state of charge of the battery 30 is equal to or greater than "80%", meaning that the priority of reducing the state of charge of the battery 30 is high, the heater control part 53 drives the heater 16 in a mode in which the heater 16 is at a relatively high temperature. This can reduce the state of charge of the battery 30 in a short time. On the other hand, if the state of charge is less than "80%" and equal to or greater than "70%", the heater 16 is driven in a mode in which the heater 16 is at a relatively low temperature.

(Determination of the Drive Mode)

A drive mode of the heater 16 is determined only on the basis of the state of charge of the battery 30 in the above description, but the drive mode of the heater 16 may be determined on the basis of the state of charge of the battery 30 and the temperature of the after-treatment device 60. The heater control part 53 drives the heater 16 at the second set temperature if the state of charge is less than the first threshold and equal to or greater than the second threshold, and the temperature in the after-treatment device 60 is lower than a predetermined set value, for example. Specifically, the heater control part 53 drives the heater 16 at the second set temperature if the temperature in the after-treatment device 60 is lower than the predetermined set value, which indicates that the temperature in the after-treatment device 60 is relatively low.

The heater control part 53 does not need to drive the heater 16 if the temperature in the after-treatment device 60 is equal to or higher than the predetermined set value (in other words, the necessity of raising the temperature of the catalyst of the after-treatment device 60 is low).

According to such control, if the priority of reducing the state of charge of the battery 30 is medium, the electric power of the battery 30 can be effectively utilized for raising the temperature of the catalyst, in consideration of the temperature of the catalyst of the after-treatment device 60 being low. Raising the temperature of the catalyst can improve the catalyst's performance in purifying exhaust gas.

(Heating the SCR)

In the vehicle S100 of the present embodiment, the first purification device 60A and the second purification device 60B are arranged as shown in FIG. 1, and the SCR 65 is provided to the second purification device 60B, which is downstream of the first purification device 60A. If it is determined that maintaining or improving the exhaust gas purification performance of an SCR catalyst is prioritized, exhaust gas heated by the heater 16 may be supplied directly to the second purification device 60B through the bypass passage P12. This makes it possible to effectively raise the temperature of the SCR 65 by using heat of the heater 16 while consuming the electric power of the battery 30, thereby maintaining or improving the purification performance. The following describes a specific example.

The heater control part 53 includes a valve control part 54 as described above. The valve control part 54 controls the operation of the valve 64. The DPD regeneration should be prioritized if the DPD regeneration needs to be performed. Therefore, it is preferable that heating of the SCR 65 be performed in a case where the necessity for the DPD regeneration is low.

Accordingly, the valve control part 54 performs the following control. First, the acquiring part 52 acquires a cumulative travel distance of the vehicle S100 since the moment at which the previous DPD regeneration was performed. The valve control part 54 drives the heater 16 and operates the valve 64 so as to open the valve 64 if (i) the cumulative travel distance, acquired by the acquiring part 52, since a regeneration operation was performed is less than a predetermined set value (e.g., 100 km); (ii) the state of charge of the battery 30 is less than the first threshold and equal to or greater than the second threshold in a similar manner as the above description: and (iii) the temperature in the after-treatment device 60 is lower than the predetermined set value.

As a result, exhaust gas heated by the heater 16 is supplied to the second purification device 60B via the bypass passage P12. In a case where the priority of performing the DPD regeneration is low, such control allows exhaust gas heated by the heater 16 to be supplied to the second purification device 60B through the bypass passage P12, raising the temperature of the SCR 65 efficiently.

(Example of the Operation)

Figure 4:
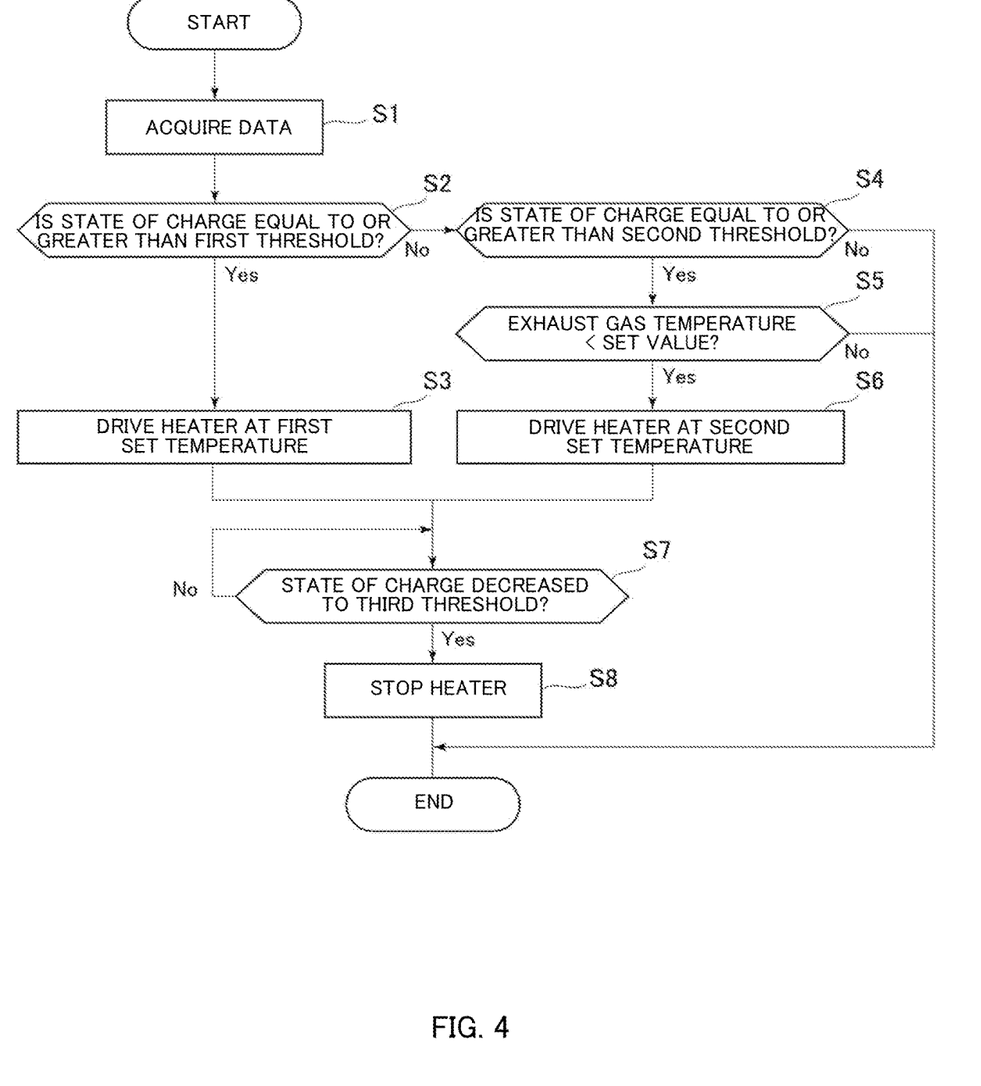
FIG. 4 is a flowchart showing an example of SOC control realized by driving a heater in the vehicle.

FIG. 4 is a flowchart showing an example of the SOC control realized by driving the heater in the vehicle S100. It should be noted that all the steps shown in FIG. 4 are not necessarily required, and some steps may be omitted as appropriate without changing the scope of the present disclosure.

First, in step S1, the acquiring part 52 acquires data such as the state of charge of the battery 30 and the temperature in the after-treatment device 60.

Next, in step S2, the heater control part 53 determines whether the state of charge of the battery 30 acquired by the acquiring part 52 is equal to or greater than the first threshold. If the determination in step S1 is "Yes", the heater control part 53 drives the heater 16 at the first set temperature in step S3. Specifically, the heater control part 53 drives the heater 16 so that the electric power of the battery 30 is supplied to the heater 16 to heat the heater 16.

If the determination in step S2 is "No", the heater control part 53 determines whether the state of charge of the battery 30 is equal to or greater than the second threshold, in step S4.

If the determination in step S4 is "NO", (that is, the state of charge of the battery 30 is not high, meaning that the necessity of reducing the state of charge is low), the heater control part 53 ends processing.

If the determination in step S4 is "YES", the heater control part 53 determines whether the temperature in the after-treatment device 60 is lower than the predetermined set value, in step S5. For example, if the temperature of the inlet of the CSF 63 (the temperature of exhaust gas) is lower than the predetermined set value, meaning that raising the catalyst temperature of the after-treatment device 60 and increasing the purification performance are beneficial, the heater control part 53 drives the heater 16 in step S6. Specifically, the heater control part 53 drives the heater 16 at the second set temperature (step S6).

If the determination in step S5 is "NO" (that is, the temperature of the exhaust gas is high, meaning that the necessity of raising the catalyst temperature is low), the heater control part 53 ends the processing.

After driving the heater 16, the heater control part 53 determines whether the state of charge of the battery 30 has decreased to the third threshold in step S7, and if the state of charge has decreased to the third threshold ("Yes" in step S7), the heater control part 53 stops driving the heater 16 in step S8. This completes the series of processes.

(Another Example of the Operation)

Figure 5:
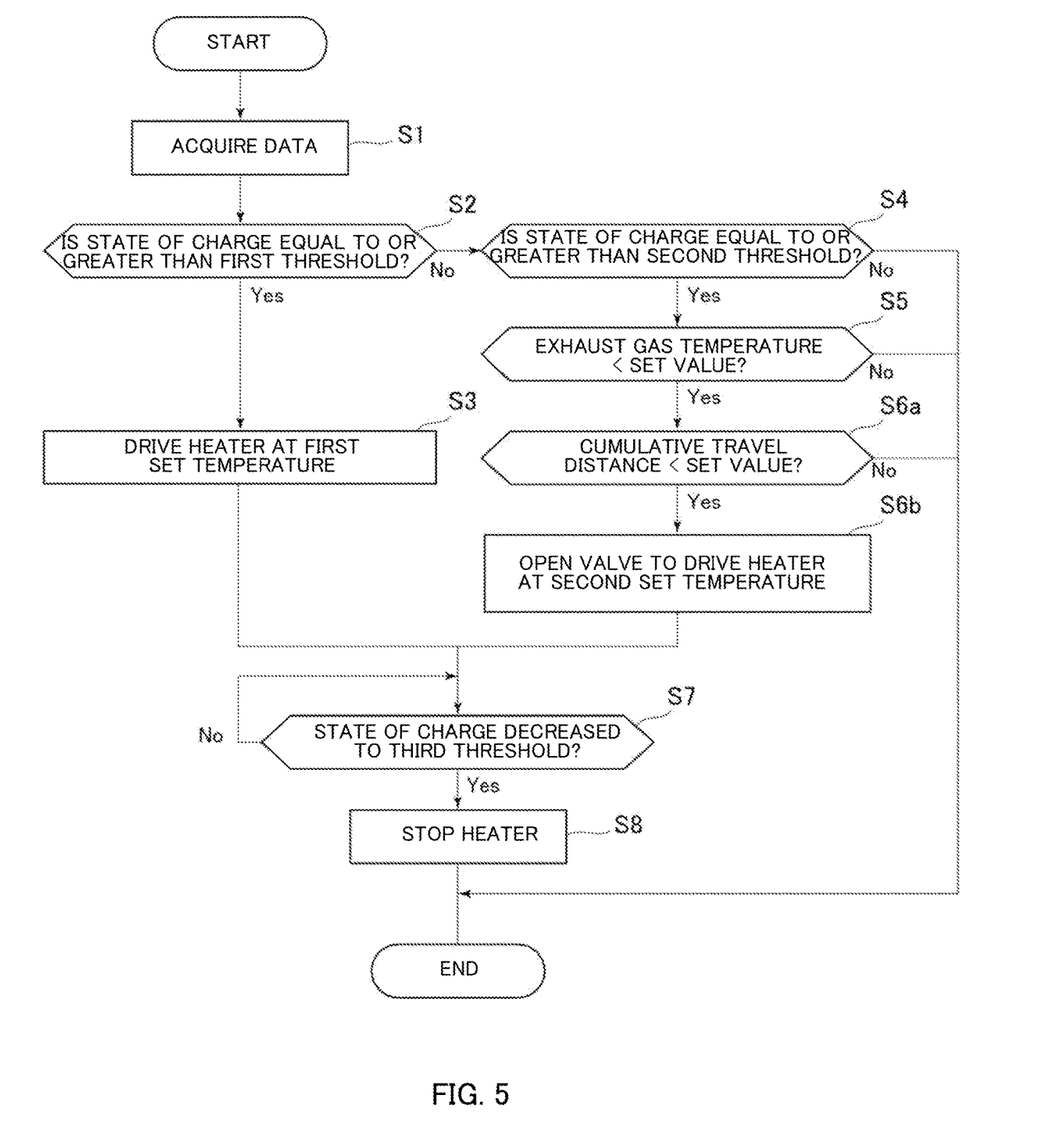
FIG. 5 is a flowchart showing another example of the SOC control realized by driving the heater in the vehicle.

FIG. 5 is a flowchart showing another example of the SOC control realized by driving the heater in the vehicle. FIG. 5 shows a modification of step S6 in the flowchart of FIG. 4. Since the other steps are the same as those of FIG. 4, descriptions in common with FIG. 4 will be omitted.

In the flowchart of FIG. 5, heating the SCR as described above is performed. After step S5, the heater control part 53 determines whether the cumulative travel distance of the vehicle S100, since the previous DPD regeneration, is less than the predetermined set value in step S6a.

If the determination in step S6a is "YES", (specifically, the cumulative travel distance has not reached a value that is set as the predetermined set value, such as 100 km), the heater control part 53 drives the heater 16 (step S6b). As an example, the heater control part 53 drives the heater 16 at the second set temperature. The valve control part 54 operates the valve 64 and opens the bypass passage P12 to supply exhaust gas to the second purification device 60B. If the determination in step S6a is "NO", the heater control part 53 ends the processing.

If the priority of performing the DPD regeneration is low, such control allows exhaust gas heated by the heater 16 to be supplied to the second purification device 60B through the bypass passage P12, raising the temperature of the SCR 65 efficiently.

In the above description, it should be noted that the heater 16 is driven at the first set temperature and the second set temperature, but the temperature of the heater 16 (in other words, the amount of electric power supplied from the battery 30) can be changed as appropriate. In FIG. 4, steps S4 to S6 are performed in addition to steps S2 and S3, but steps S4 to S6 may be omitted in consideration of simply reducing the state of charge of the battery 30.

Effect of the Embodiment

As described above, according to the present embodiment, if the state of charge of the battery 30 is equal to or greater than the first threshold, the heater 16 is driven to reduce the electric power of the battery 30, so that the braking recovery function can be restored early.

Further, according to the present embodiment, as described with reference to FIGS. 3 and 4, the heater 16 is driven at the first set temperature or the second set temperature according to the state of charge. In particular, if the priority of reducing the state of charge of the battery 30 is high, the heater 16 is driven at the first set temperature, so that the braking recovery function can be restored early.

While one implementation of the present disclosure has been described in association with the functions and operation of the electronic device 50, the present specification also discloses the invention of a computer program executed by a processor and the invention of a control method. In the above embodiment, the heater control part 53 and the valve control part 54 have been described separately, but such control by these control parts may be performed by the control part 51.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Effects of the new exemplary embodiments brought by the combinations also have the effects of the original exemplary embodiments.

What is claimed is:

1. An electronic device comprising:
   an acquiring part that acquires a state of charge of a battery that is electrically connected to a generator performing recovery power generation and is charged by the generator; and
   a control part that controls driving of a heater that raises a temperature of a catalyst of an after-treatment device that purifies exhaust gas discharged from an engine,
   wherein the control part controls the heater so that the heater is heated by electric power of the battery if a state of charge of the battery acquired by the acquiring part is equal to or greater than a first threshold, and
   wherein the after-treatment device includes:
      a first purification device that is provided in a flow path through which the exhaust gas flows and has a filter for collecting particulate matter in the exhaust gas;
      a second purification device that is provided downstream of the first purification device and has a selective reduction catalyst serving as the catalyst;
      a bypass passage that supplies the exhaust gas to the second purification device by bypassing the first purification device; and
      a valve that is provided in the bypass passage,
   wherein the acquiring part acquires a cumulative travel distance from when a regeneration operation of the filter was performed, and
   wherein the control part operates the valve to supply the exhaust gas to the second purification device via the bypass passage, if (i) the cumulative travel distance acquired by the acquiring part is less than a predetermined set value; (ii) the state of charge acquired by the acquiring part is less than the first threshold and equal to or greater than a second threshold; and
   (iii) a temperature in the after-treatment device is lower than a predetermined set value.

2. The electronic device according to claim 1, wherein the control part drives the heater at a first set temperature if the state of charge is equal to or greater than the first threshold, and
   the control part drives the heater at a second set temperature that is lower than the first set temperature if the state of charge is less than the first threshold and equal to or greater than a second threshold.

3. The electronic device according to claim 1, wherein the control part drives the heater at a first set temperature if the state of charge acquired by the acquiring part is equal to or greater than the first threshold, and
   the control part drives the heater at a second set temperature that is lower than the first set temperature if the state of charge is less than the first threshold and equal to or greater than a second threshold, and a temperature in the after-treatment device is lower than a predetermined set value.

4. A vehicle comprising the electronic device according to claim 1.

5. A control method, executed by a computer, for controlling driving of a heater that raises a temperature of a catalyst of an after-treatment device that purifies exhaust gas discharged from an engine; comprising:
   acquiring a state of charge of a battery that is electrically connected to a generator performing recovery power generation and is charged by the generator; and
   driving the heater so that the heater is heated by electric power of the battery if an acquired state of charge of the battery is equal to or greater than a first threshold,
   wherein the after-treatment device includes:
      a first purification device that is provided in a flow path through which the exhaust gas flows and has a filter for collecting particulate matter in the exhaust gas;
      a second purification device that is provided downstream of the first purification device and has a selective reduction catalyst serving as the catalyst;
      a bypass passage that supplies the exhaust gas to the second purification device by bypassing the first purification device; and
      a valve that is provided in the bypass passage,
   wherein the method further comprises:
      acquiring a cumulative travel distance from when a regeneration operation of the filter was performed; and
      operating the valve to supply the exhaust gas to the second purification device via the bypass passage, if (i) the cumulative travel distance acquired by an acquiring part is less than a predetermined set value; (ii) the state of charge acquired by the acquiring part is less than the first threshold and equal to or greater than a second threshold; and (iii) a temperature in the after-treatment device is lower than a predetermined set value.

6. The control method according to claim 5, wherein the driving the heater includes:
   driving the heater at a first set temperature if the state of charge is equal to or greater than the first threshold, and
   driving the heater at a second set temperature that is lower than the first set temperature if the state of charge is less than the first threshold and equal to or greater than a second threshold.

* * * * *